United States Patent Office 3,299,075
Patented Jan. 17, 1967

3,299,075
SPIRO[3H-INDOLE-3,3'-PYRROLIDINE AND PIPERIDINE] DERIVATIVES
Jerry A. Weisbach, Cherry Hill, N.J., assignor to Smith Kline & French Laboratories, Philadelphia, Pa., a corporation of Pennsylvania
No Drawing. Filed Mar. 12, 1964, Ser. No. 351,542
5 Claims. (Cl. 260—293)

This invention relates to new spiro[3H-indole-3,3'-pyrrolidine and piperidine] derivatives having pharmacodynamic activity, in particular having antipyretic and analgesic activity.

The novel compounds of this invention are represented by the following general formulas:

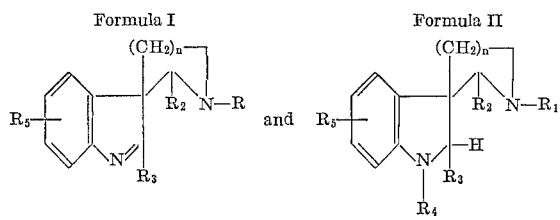

when:
R is tolylsulfonyl, benzenesulfonyl, halobenzenesulfonyl, lower alkoxybenzenesulfonyl or lower alkylsulfonyl;
$R_1$ is tolylsulfonyl, benzenesulfonyl, halobenzenesulfonyl, lower alkoxybenzenesulfonyl, lower alkylsulfonyl, hydrogen, lower alkyl or lower alkanoyl;
$R_3$ is phenyl, halophenyl, lower alkoxyphenyl, lower alkylphenyl, methylenedioxyphenyl, furyl, pyridyl, C-piperidyl or C-pyrrolyl;
$R_3$ is phenyl, halophenyl, lower alkoxyphenyl, lower alkylphenyl or pyridyl;
$R_4$ is hydrogen or lower alkyl;
$R_5$ is hydrogen, halogen, lower alkoxy or lower alkyl; and
$n$ is an integer of from 1 to 2.

Preferred compounds of this invention are those of Formula II above in which:
$R_1$ is hydrogen or lower alkyl;
$R_2$ is as defined above;
$R_3$ is phenyl or pyridyl;
$R_4$ is hydrogen or lower alkyl;
$R_5$ is hydrogen, halogen, methoxy or methyl and $n$ is 1.

The terms "lower alkyl" and "lower alkoxy" where used herein denote groups having 1–4 carbon atoms, preferably 1–2 carbon atoms. The term "lower alkanoyl" denotes groups having preferably 2–4 carbon atoms.

This invention also includes pharmaceutically acceptable, nontoxic, acid addition salts of the above defined bases formed with organic and inorganic acids. Such salts are easily prepared by methods known to the art. The base is reacted with an excess of organic or inorganic acid in a lower alkanol solvent, such as methanol or preferably ethanol, with isolation of the salt by filtration. Exemplary of such organic salts are those with maleic, fumaric, ascorbic, succinic, methanesulfonic, ethanedisulfonic, acetic, tartaric, salicylic, citric, lactic, malic, benzene sulfonic and theophylline acetic acids as well as with the 8-halotheophyllines, for example 8-bromotheophylline. Exemplary of such inorganic salts are those with hydrochloric, hydrobromic, sulfuric, phosphoric and nitric acids. Of course, these salts may also be prepared by the classical method of double decomposition of appropriate salts which is well-known to the art.

Compounds of this invention are prepared by the following procedure:

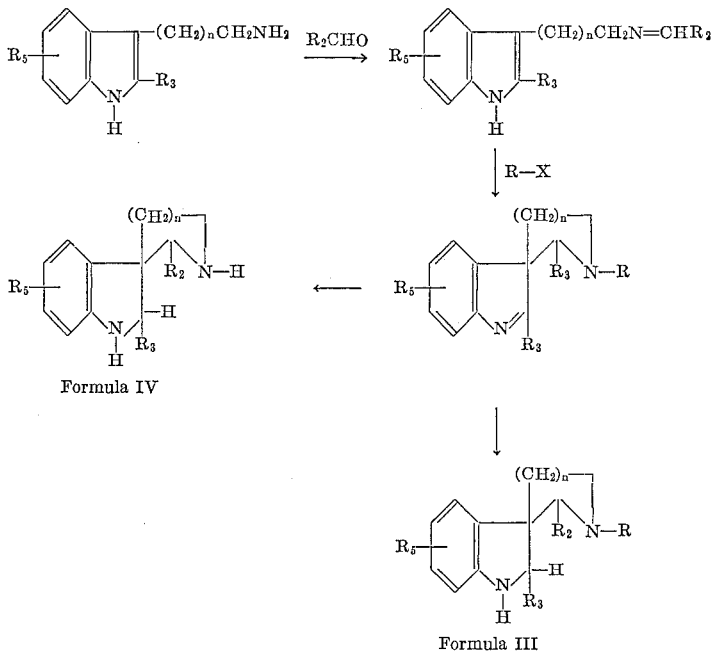

The terms R, $R_2$, $R_3$, $R_5$ and $n$ are as defined above and X is halogen.

According to the above procedure a 3-(2-aminoethyl or 3-propyl)-indole (which is either known to the art or may be prepared by known methods such as the methods of U.S. 2,814,625 and U.S. 2,870,162) is condensed with an aldehyde. The resulting Schiff base is reacted with a benzene- or lower alkylsulfonyl halide, having the formula R—X in which R is as defined above, in the presence of a tertiary amine such as pyridine to give the spiro[3H-indole-3,3'-pyrrolidines and piperidines] of this invention (Formula I). Reduction of the indole compounds with an alkali metal borohydride, such as sodium borohydride or lithium borohydride, in a lower alkanol solvent such as methanol gives the corresponding spiro[indoline-3,3'-pyrrolidines and piperidines] from which the sulfonyl group, i.e. the R group of Formula I, may be removed by treatment with lithium aluminum hydride in tetrahydrofuran or sodium in butanol. Alternatively, the spiro[3H-indole-3,3'-pyrrolidine and piperidine] compounds may be treated with lithium aluminum hydride in tetrahydrofuran or sodium in butanol to both reduce the double bond in the indole ring and remove the sulfonyl group. To prepare the products containing a halo substituent or a reducible heterocyclic ring, such as pyridyl, the lithium aluminum hydride method is preferred.

The 1 and 1'-lower alkyl compounds of Formula II are prepared by alkylation with alkylating agents such as lower alkyl halides or dimethyl sulfate in a lower alkanol solvent. Compounds of Formula II in which $R_4$ is lower alkyl and $R_1$ is hydrogen are conveniently prepared by alkylating the 1'-sulfonyl compounds of Formula III and then removing the sulfonyl group by treating with lithium aluminum hydride in tetrahydrofuran or sodium in butanol. Compounds of Formula II in which $R_1$ is lower alkyl and $R_4$ is hydrogen are prepared by reacting the compounds of Formula IV with one equivalent of the alkylating agent. The compounds of Formula II in which $R_1$ is lower alkanoyl are prepared by reacting the compounds of Formula IV with a lower alkanoic acid anhydride or a lower alkanoyl halide.

The following examples are not limiting but are illustrative of compounds of this invention.

Example 1

A mixture of 10.0 g. of 3-(2-aminoethyl)-2-phenylindole, 4.9 g. of benzaldehyde, 250 ml. of benzene and 0.20 g. of Amberlite IR–120 is boiled at reflux with constant separation of water for two hours. The hot mixture is filtered and the solvent removed in vacuo. A viscous oil is obtained which is washed with petroleum ether after which residual traces of organic solvent are removed in vacuo. The viscous residue is dissolved in 100 ml. of dry pyridine and the solution cooled to 0° C. Ten grams of p-toluenesulfonyl chloride is added; the mixture is shaken until solution is effected and left in an ice bath to warm to room temperature over 18 hours. Water (125 ml.) is added dropwise to the stirred solution. The crystalline product which separates is filtered with suction, washed with water and cold ether, dried in vacuo and recrystallized from methanol to give 2,2'-diphenyl-1'-(p-toluenesulfonyl)-spiro[3H-indole - 3, 3'-pyrrolidine], M.P. 170–172° C.

Example 2

Five grams of sodium borohydride is added to a warm mixture of 5.07 g. of 2,2'-diphenyl-1'-(p-toluenesulfonyl)-spiro[3H-indole-3,3'-pyrrolidine], prepared as in Example 1, in 125 ml. of methanol. The mixture becomes homogeneous and a white crystalline solid separates. After ten minutes, 500 ml. of water is added and the product is filtered with suction, dried in vacuo and recrystallized from a methanol-ethanol mixture to give 2,2'-diphenyl-1'-(p - toluenesulfonyl) - spiro[indoline-3,3'-pyrrolidine], M.P. 210–212.5° C.

Example 3

To a warm, stirred solution of 5.0 g. of 2,2'-diphenyl-1' - (p - toluenesulfonyl)-spiro[3H-indole-3,3'-pyrrolidine], prepared as in Example 1, in 150 ml. of n-butanol, 15.5 g. of sodium is added in portions. The mixture is boiled at reflux for two hours. Hydrochloric acid (18%, 200 ml.) is added and the mixture distilled until the distillate is clear and homogeneous. The residue is treated with additional hydrochloric acid (10%, 200 ml.) and the acidic solution extracted with ether. The aqueous layer is made alkaline with ammonia and the resultant white precipitate is filtered, washed with water, dried in vacuo and recrystallized from methanol to give 2,2'-diphenylspiro[indoline-3,3'-pyrrolidine], M.P. 210–212° C.

Example 4

Fifty grams of 3-(2-aminoethyl)-2-phenylindole, 29.8 g. of p-chlorobenzaldehyde, a few grains of Amberlite IR–120 and 1 l. of toluene are heated at reflux with constant water separation for 3.5–4 hours. Working up as in Example 1, adding dry pyridine and 50 g. of p-toluenesulfonyl chloride and treating as in Example 1 gives 2-phenyl-2'-(p-chlorophenyl)-1'-(p-toluenesulfonyl) - spiro [3H-indole-3,3'-pyrrolidine].

To a warm stirred mixture of 5 g. of 2-phenyl-2'-(p-chlorophenyl)-1'-(p-toluenesulfonyl) - spiro[3H - indole-3,3'-pyrrolidine] in 250 ml. of methanol is added 7 g. of sodium borohydride. Working up as in Example 2 gives 2 - phenyl - 2'-(p-chlorophenyl)-1'-(p-toluenesulfonyl)-spiro[indoline-3,3'-pyrrolidine].

A mixture of 16 g. of 2-phenyl-2'-(p-chlorophenyl)-1'-(p - toluenesulfonyl) - spiro[3H-indole-3,3'-pyrrolidine], 20 g. of lithium aluminum hydride and 400 ml. of tetrahydrofuran is stirred and heated at reflux for four days. Water and ether are added and the solid material is filtered off. Hydrochloric acid is added to the filtrate and the mixture is stirred and filtered. The aqueous layer is separated and made alkaline with ammonia and extracted with chloroform, washed, dried and concentrated. The residue is recrystallized from benzene-petroleum to give 2 - phenyl - 2'-(p-chlorophenyl)-spiro[indoline-3,3'-pyrrolidine].

Example 5

A mixture of 50 g. of 3-(2-aminoethyl)-2-phenylindole, 23.5 g. m-methoxybenzaldehyde, a small amount of Amberlite IR–120 and 1250 ml. of toluene is heated at reflux for about four hours with constant water separation. Working up and treating with pyridine and p-toluenesulfonyl chloride as in Example 1 gives 2-phenyl-2'-(m-methoxyphenyl)-1'-(p-toluenesulfonyl)-spiro[3H-indole - 3,3'-pyrrolidine].

Forty-nine grams of the above compound in n-butanol is warmed, stirred and treated with 150 g. of sodium in small portions. Working up as in Example 3 gives 2-phenyl-2'-(m-methoxyphenyl)-spiro[indoline - 3,3' - pyrrolidine].

Example 6

A mixture of 10 g. of 3-(2-aminoethyl)-2-phenylindole, 4.54 g. of 2-pyridinecarboxaldehyde, a few grains of Amberlite IR–120 and 250 ml. of toluene is heated at reflux with a constant water separator for 140 minutes. The mixture is worked up as in Example 1 and treated with dry pyridine and 10 g. of p-toluenesulfonyl chloride as in Example 1 to give 2-phenyl-2'-(2''-pyridyl)-1'-(p-toluenesulfonyl)-spiro[3H-indole-3,3'-pyrrolidine].

According to the procedure of Example 3, 45 g. of 2-phenyl-2'-(2''-pyridyl)-1'-(p-toluenesulfonyl) - spiro[3H-indole-3,3'-pyrrolidine] in n-butanol is treated with 150 g. of sodium in portions. The mixture is refluxed and worked up as in Example 3 to give 2-phenyl-2'-(2''-piperidyl)-spiro[indoline-3,3'-pyrrolidine].

Example 7

A mixture of 80 g. of 3-(2-aminoethyl)-2-(p-chlorophenyl)-indole, 31.7 g. of 2-pyridinecarboxaldehyde, 1.0 g. of Amberlite IR–120 and 1200 ml. of toluene is heated at reflux under a constant water separator for four hours. Working up as in Example 1 and treating with dry pyridine and p-toluenesulfonyl chloride gives 2-(p-chlorophenyl)-2'-(2''-pyridyl)-1'-(p-toluenesulfonyl)-spiro[3H - indole-3,3'-pyrrolidine].

Example 8

Eight grams of 3-(2-aminoethyl)-2-(p-chlorophenyl)-indole, 41.6 g. of p-chlorobenzaldehyde, 1 g. of Amberlite IR-120 and 120 ml. of toluene are heated at reflux under a constant water separator for about 3 hours. The resulting mixture is worked up and treated with pyridine and p-toluenesulfonyl chloride as in Example 1 to give 2,2'-di-(p-chlorophenyl)-1'-(p-toluenesulfonyl) - spiro[3H - indole-3,3'-pyrrolidine].

Five grams of the above prepared product in 250 ml. of methanol is stirred and warmed and treated with 10 g. of sodium borohydride. The mixture is allowed to stand for 1.5 hours and then is diluted with methanol to 1 l. and filtered to give 2,2'-di-(p-chlorophenyl)-1'-(p-toluenesulfonyl)-spiro[indoline-3,3'-pyrrolidine].

To 15 g. of 2,2'-di-(p-chlorophenyl)-1'-(p-toluenesulfonyl)-spiro[3H-indole-3,3'-pyrrolidine] in 300 ml. of tetrahydrofuran is added 20 g. of lithium aluminum hydride and the resulting mixture is heated at reflux for four days. Working up as in Example 4 and recrystallizing from ethanol gives 2,2'-di-(p-chlorophenyl)-spiro[indoline-3,3'-pyrrolidine].

Example 9

A mixture of 80 g. of 3-(2-aminoethyl)-2-(p-chlorophenyl)-indole, 44.8 g. of piperonal, 1 g. of Amberlite IR-120 and 1200 ml. of toluene is heated at reflux for about 3.5 hours, worked up and treated with 800 ml. of dry pyridine and 80 g. of p-toluenesulfonyl chloride as in Example 1 to give 2-(2-p-chlorophenyl)-2'-(3,4-methylenedioxyphenyl)-spiro[3H-indole-3,3'-pyrrolidine].

Treating 5 g. of the above prepared compound in 250 ml. of methanol with 10 g. of sodium borohydride gives 2-(p-chlorophenyl)-2'-(3,4 - methylenedioxyphenyl) - 1'-(p-toluenesulfonyl)-spiro[indoline-3,3'-pyrrolidine].

A mixture of 26.0 g. of 2-(p-chlorophenyl)-2'-(3,4-methylenedioxyphenyl)-1'-(p-toluenesulfonyl) - spiro[3H-indole-3,3'-pyrrolidine], 30 g. of lithium aluminum hydride and 400 ml. of tetrahydrofuran is heated at reflux for four days and worked up as in Example 4 to give 2-(p-chlorophenyl)-2'-(3,4 - methylenedioxyphenyl) - spiro[indoline-3,3'-pyrrolidine].

Example 10

A mixture of 80 g. of 3-(2-aminoethyl)-3-(p-chlorophenyl)indole, 40.3 g. of m-methoxybenzaldehyde, 1 g. of Amberlite IR-120 and 1200 ml. of toluene is heated at reflux for about six hours. Working up and treating with 800 ml. of pyridine and 80 g. of p-toluenesulfonyl chloride gives 2-(p-chlorophenyl)-2'-(m-methoxyphenyl) - 1'-(p-toluenesulfonyl)-spiro[3H-indole-3,3'-pyrrolidine].

Treating 5 g. of the above prepared compound in 250 ml. of methanol and 10 g. of sodium borohydride as in Example 3 gives 2-(p-chlorophenyl)-2' - (m - methoxyphenyl)-1'-(p-toluenesulfonyl)-spiro[indoline - 3,3' - pyrrolidine].

To a mixture of 15 g. of 2-(p-chlorophenyl)-2'-(m-methoxyphenyl)-1'-(p-toluenesulfonyl)-spiro[3H - indole-3,3'-pyrrolidine] in 300 ml. of tetrahydrofuran is added 20 g. of lithium aluminum hydride and the resulting mixture is heated at reflux for four days to give, after working up as in Example 4, 2-(p-chlorophenyl)-2'-(m-methoxyphenyl)-spiro[indoline-3,3'-pyrrolidine].

Example 11

A mixture of 16 g. of 3-(2-aminoethyl)-2-(p-chlorophenyl)indole, 62.4 g. of benzaldehyde, a few grains of Amberlite IR-120 and 300 ml. of toluene is refluxed for 1.5 hours. The resulting mixture is worked up and treated with 160 ml. of dry pyridine and 16 g. of toluenesulfonyl chloride as in Example 1 to give 2-(p-chlorophenyl)-2'-phenyl-1'-(p-toluenesulfonyl)-spiro[3H - indole - 3,3'-pyrrolidine].

A mixture of 16 g. of the above prepared compound, 20 g. of lithium aluminum hydride and 400 ml. of tetrahydrofuran is refluxed for four days and worked up as in Example 4 to give 2-(p-chlorophenyl)-2'-phenylspiro[indoline-3,3'-pyrrolidine].

Example 12

Ten grams of 3-(2-aminoethyl)-2-phenylindole, 4.08 g. of 2-furylaldehyde, a few grains of Amberlite IR-120 and 250 ml. of benzene are heated at reflux for two hours. Working up, adding 100 ml. of pyridine and 10 g. of toluenesulfonyl chloride and treating as in Example 1 gives 2 - phenyl-2'-(2''-furyl)-spiro[3H-indole-3,3'-pyrrolidine].

A mixture of 2.98 g. of the above prepared compound, 100 ml. methanol and 5 g. of sodium borohydride is warmed on a steam bath and allowed to stand at room temperature for 45 minutes. After working up as in Example 2, 2 - phenyl-2'-(2''-furyl)-1'-(p-toluenesulfonyl)-spiro[indoline-3,3'-pyrrolidine is obtained.

Example 13

A mixture of 25 g. of 3-(2-aminoethyl)-2-phenylindole, 11.35 g. of 4-pyridinecarboxaldehyde, a few grains of Amberlite IR-120 and 500 ml. of toluene is heated at reflux for about two hours, worked up and treated with 200 ml. of dry pyridine and 25 g. of p-toluenesulfonyl chloride as in Example 1 to give 2-phenyl-2'-(4''-pyridyl)-1'-(p-toluenesulfonyl)-spiro[3H-indole-3,3'-pyrrolidine].

Treatment of the above prepared compound with lithium aluminum hydride in tetrahydrofuran as in Example 4 gives 2-phenyl-2'-(4''-pyridyl)-spiro[indoline-3,3'-pyrrolidine].

Example 14

By the procedure of Example 1, 3-(2-aminoethyl)-2-phenylindole is reacted with:

m-bromobenzaldehyde
p-fluorobenzaldehyde
p-tolualdehyde
p-propoxybenzaldehyde
2-pyrrolecarboxaldehyde and
3-piperidinecarboxaldehyde to give the following compounds:

2-phenyl-2'-(m-bromophenyl)-1'-(p-toluenesulfonyl)-spiro[3H-indole-3,3'-pyrrolidine]
2-phenyl-2'-(p-fluorophenyl)-1'-(p-toluenesulfonyl)-spiro[3H-indole-3,3'-pyrrolidine]
2-phenyl-2'-(p-tolyl)-1'-(p-toluenesulfonyl)-spiro[3H-indole-3,3'-pyrrolidine]
2-phenyl-2'-(p-propoxyphenyl)-1'-(p-toluenesulfonyl)-spiro[3H-indole-3,3'-pyrrolidine]
2-phenyl-2'-(2''-pyrrolyl)-1'-(p-toluenesulfonyl)-spiro[3H-indole-3,3'-pyrrolidine] and
2-phenyl-2'-(3''-piperidyl)-1'-(p-toluenesulfonyl)-spiro[3H-indole-3,3'-pyrrolidine], respectively.

Treating the above prepared spiro[3H-indole-3,3'-pyrrolidines] in methanol with sodium borohydride as in Example 2 gives the corresponding spiro[indoline-3,3'-pyrrolidines].

Example 15

Refluxing a mixture of 10 g. of 3-(2-aminoethyl)-2-phenylindole, 4.9 g. of benzaldehyde, 250 ml. of benzene and 0.20 g. of Amberlite IR-120 for two hours, working up as in Example 1, adding 100 ml. of dry pyridine, cooling to 0° C., adding 10 g. of benzenesulfonyl chloride and treating as in Example 1 gives 2,2'-diphenyl-1'-benzenesulfonyl-spiro[3H-indole-3,3'-pyrrolidine].

The above prepared compound is refluxed with sodium in n-butanol as in Example 3 to give 2,2'-diphenyl-spiro-[indoline-3,3'-pyrrolidine].

Similarly using in place of benzenesulfonyl chloride the following:

methanesulfonyl chloride
ethanesulfonyl chloride
p-chlorobenzenesulfonyl chloride and
p-methoxybenzenesulfonyl chloride the following compounds are obtained:

2,2'-diphenyl-1'-methanesulfonyl-spiro[3H-indole-3,3'-pyrrolidine]
2,2'-diphenyl-1'-ethanesulfonyl-spiro[3H-indole-3,3'-pyrrolidine]
2,2'-diphenyl-1'-(p-chlorobenzenesulfonyl)-spiro[3H-indole-3,3'-pyrrolidine] and
2,2'-diphenyl-1'-(p-methoxybenzenesulfonyl)-spiro-[3H-indole-3,3'-pyrrolidine], respectively.

Treating the above prepared compounds with sodium borohydride in methanol as in Example 2 gives:

2,2'-diphenyl-1'-(benzenesulfonyl)-spiro[indoline-3,3'-pyrrolidine]
2,2'-diphenyl-1'-(methanesulfonyl)-spiro[indoline-3,3'-pyrrolidine]
2,2'-diphenyl-1'-(ethanesulfonyl)-spiro[indoline-3,3'-pyrrolidine]
2,2'-diphenyl-1'-(p-chlorobenzenesulfonyl)-spiro-[indoline-3,3'-pyrrolidine] and
2,2'-diphenyl-1'-(p-methoxybenzenesulfonyl)-spiro[indoline-3,3'-pyrrolidine], respectively.

*Example 16*

According to the procedure of Example 1 benzaldehyde is reacted with the following indoles:

3-(2-aminoethyl)-5-methoxy-2-phenylindole
3-(2-aminoethyl)-5-ethoxy-2-phenylindole
3-(2-aminoethyl)-2-(p-tolyl)indole
3-(2-aminoethyl)-2-(p-propylphenyl)indole
3-(2-aminoethyl)-5-chloro-2-(p-chlorophenyl)indole
3-(2-aminoethyl)-6-methyl-2-(m-methoxyphenyl)indole
3-(2-aminoethyl)-2-(3'-pyridyl)indole
3-(3-aminopropyl)-2-phenylindole and
3-(3-aminopropyl)-4-methyl-2-phenylindole to give the following compounds:

2,2'-diphenyl-5-methoxy-1'-(p-toluenesulfonyl)-spiro[3H-indole-3,3'-pyrrolidine]
2,2'-diphenyl-5-ethoxy-1'-(p-toluenesulfonyl)-spiro[3H-indole-3,3'-pyrrolidine]
2-(p-tolyl)-2'-phenyl-1'-(p-toluenesulfonyl)-spiro[3H-indole-3,3'-pyrrolidine]
2-(p-propylphenyl)-2'-phenyl-1'-(p-toluenesulfonyl)-spiro[3H-indole-3,3'-pyrrolidine]
2-(p-chlorophenyl)-2'-phenyl-5-chloro-1'-(p-toluenesulfonyl)-spiro[3H-indole-3,3'-pyrrolidine]
2-(m-methoxyphenyl)-2'-phenyl-6-methyl-1'-(p-toluenesulfonyl)-spiro[3H-indole-3,3'-pyrrolidine]
2-(3''-pyridyl)-2'-phenyl-1'-(p-toluenesulfonyl)-spiro[3H-indole-3,3'-pyrrolidine]
2,2'-diphenyl-1'-(p-toluenesulfonyl)-spiro[3H-indole-3,3'-piperidine] and
2,2'-diphenyl-4-methyl-1'-(p-toluenesulfonyl)-spiro[3H-indole-3,3'-piperidine], respectively.

Treating the above prepared spiro[3H-indole-3,3'-pyrrolidines and -piperidines] in methanol with sodium borohydride as in Example 2 gives the corresponding spiro-[indoline-3,3'-pyrrolidines and -piperidines].

*Example 17*

A mixture of 4.8 g. of 2,2'-diphenyl-1'-(p-toluenesulfonyl)-spiro[indoline-3,3'-pyrrolidine], prepared as in Example 2, and 1.5 g. of methyl iodide in ethanol is refluxed for two hours and filtered to give 2,2'-diphenyl-1-methyl - 1' - (p - toluenesulfonyl) - spiro[indoline - 3,3'-pyrrolidine].

Refluxing the above prepared compound with lithium aluminum hydride in tetrahydrofuran as in Example 4 gives 2,2'-diphenyl-1-methyl-spiro[indoline-3,3'-pyrrolidine].

Similarly using n-butyl bromide in place of methyl iodide, 2,2' - diphenyl - 1 - n - butyl - 1' - (p - toluenesulfonyl)-spiro[indoline-3,3'-pyrrolidine] is obtained.

Refluxing with lithium aluminum hydride in tetrahydrofuran as in Example 4 gives 2,2'-diphenyl-1-n-butyl-spiro-[indoline-3,3'-pyrrolidine]. This product is refluxed with an excess of acetic anhydride for two hours to give 2,2'-diphenyl - 1 - n - butyl-1'-acetyl-spiro[indoline-3,3'-pyrrolidine].

*Example 18*

A mixture of 3.4 g. of 2,2'-diphenyl-spiro[indoline-3,3'-piperidine], prepared by refluxing the 2,2'-diphenyl-1'-(p-toluenesulfonyl)-spiro[indoline-3,3'-piperidine] of Example 16 with lithium aluminum hydride in tetrahydrofuran, and 1.4 g. of methyl iodide in 100 ml. of methanol is heated at reflux for three hours and filtered to give 2,2'-diphenyl - 1' - methyl - spiro[indoline - 3,3' - piperidine].

Similarly using 1.4 g. of n-butyl bromide in place of methyl iodide the product is 2,2'-diphenyl-1'-n-butyl-spiro-[indoline-3,3'-piperidine].

Refluxing 2.0 g. of 2,2'-diphenyl-spiro[indoline-3,3'-piperidine] with an excess of propionic anhydride, concentrating and filtering gives 2,2'-diphenyl-1'-propionyl-spiro[indoline-3,3'-piperidine].

What is claimed is:

1. A compound selected from the group consisting of compounds having the following formulas:

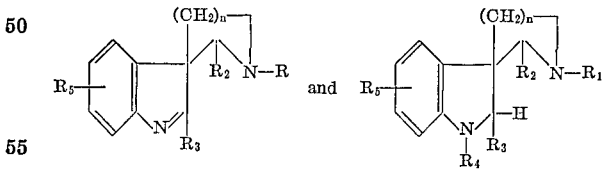

in which:
R is a member selected from the group consisting of tolylsulfonyl, benzenesulfonyl, halobenzenesulfonyl, lower alkoxybenzenesulfonyl and lower alkylsulfonyl;
$R_1$ is a member selected from the group consisting of tolylsulfonyl, benzenesulfonyl, halobenzenesulfonyl, lower alkoxybenzenesulfonyl, lower alkylsulfonyl, hydrogen, lower alkyl and lower alkanoyl;
$R_2$ is a member selected from the group consisting of phenyl, halophenyl, lower alkoxyphenyl, lower alkylphenyl, methylenedioxyphenyl, furyl, pyridyl, C-piperidyl and C-pyrrolyl;
$R_3$ is a member selected from the group consisting of phenyl, halophenyl, lower alkoxyphenyl, lower alkylphenyl and pyridyl;
$R_4$ is a member selected from the group consisting of hydrogen and lower alkyl;

$R_5$ is a member selected from the group consisting of hydrogen, halogen, lower alkoxy and lower alkyl; and $n$ is an integer of from 1 to 2 and pharmaceutically acceptable, nontoxic, acid addition salts thereof.

2. A compound having the formula:

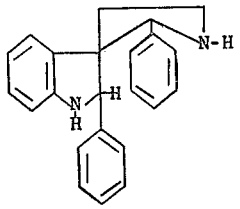

3. A compound having the formula:

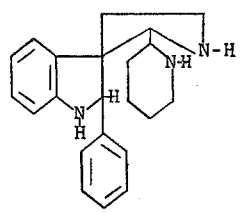

4. A compound having the formula:

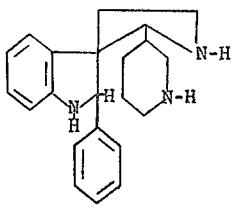

5. A compound having the formula:

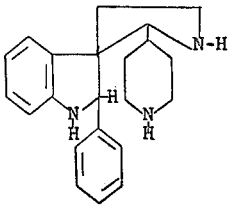

No references cited.

WALTER A. MODANCE, *Primary Examiner.*
AVROM D. SPEVACK, *Assistant Examiner.*